United States Patent [19]

Barker et al.

[11] Patent Number: 5,076,959

[45] Date of Patent: Dec. 31, 1991

[54] NOVEL COMPOSITION COMPRISING ISOCYANATE-REACTIVE HYDROGEN-CONTAINING COMPOUNDS

[75] Inventors: Martin C. Barker; Anthony Cunningham, both of Bertem, Belgium

[73] Assignee: Imperial Chemical Industries plc, London, England

[21] Appl. No.: 409,698

[22] Filed: Sep. 20, 1989

[30] Foreign Application Priority Data

Sep. 28, 1988 [GB] United Kingdom ............... 8822788

[51] Int. Cl.$^5$ .............................................. C09K 3/00
[52] U.S. Cl. .............................. 252/182.13; 252/350; 521/122; 521/128
[58] Field of Search .......................... 252/350, 182.13; 521/122, 128

[56] References Cited

U.S. PATENT DOCUMENTS

| | | | |
|---|---|---|---|
| 3,227,666 | 1/1966 | Showalter | 260/2.5 |
| 4,338,220 | 7/1982 | Sugerman | 252/430 |
| 4,558,075 | 12/1985 | Suss et al. | 523/216 |

FOREIGN PATENT DOCUMENTS

| | | |
|---|---|---|
| 0008044 | 2/1980 | European Pat. Off. |
| 0070338 | 1/1983 | European Pat. Off. |
| 0228234 | 7/1987 | European Pat. Off. |
| 440513 | 12/1967 | Switzerland |

*Primary Examiner*—Morton Foelak
*Attorney, Agent, or Firm*—Cushman, Darby & Cushman

[57] ABSTRACT

Novel compositions comprising isocyanate-reactive hydrogen containing compounds, an organo clay and a cyclic alkylene carbonate. The compositions are useful for making flexible polyurethane foams and rigid polyurethane and polyisocyanurate foams.

8 Claims, No Drawings

COMPOSITION COMPRISING ISOCYANATE-REACTIVE HYDROGEN-CONTAINING COMPOUNDS

The present invention is concerned with novel compositions comprising isocyanate-reactive hydrogen containing compounds. Isocyanate-reactive hydrogen containing compounds like polyamines and polyols have been known for a long time. They may be used for preparing polyurethanes and especially polyurethane foams, like rigid and flexible foams.

Surprisingly it has been found that by using a composition comprising an isocyanate-reactive hydrogen containing compound, an organo clay and a cyclic polar activator improved foams can be obtained.

Flexible foams prepared from such novel compositions showed improved cell-opening characteristics, making such foams more readily crushable or even avoiding the need of crushing. Rigid foams prepared from such compositions appeared to exhibit lower density.

Accordingly, the present invention is concerned with a composition comprising an isocyanate-reactive hydrogen containing compound, an organo clay and a cyclic alkylene carbonate. The cyclic alkylene carbonate acts as a polar activator and is a cyclic alkylene ester of carbonic acid.

These carbonates are referred to hereinafter as "polar activator".

The composition according to the present invention may be used for preparing flexible and rigid polyurethane foams and rigid polyisocyanurate foams. Hence, the present invention is still further concerned with polyurethane and polyisocyanurate foams prepared from a polyisocyanate and a composition according to the present invention optionally in the presence of conventional auxiliary additives and with a process for preparing these foams by reacting the polyisocyanate and the composition under foam-forming conditions, optionally in the presence of conventional auxiliary additives. As known, polyurethanes may be prepared by reacting polyisocyanates and isocyanate-reactive hydrogen containing compounds, in the presence of a catalyst and a blowing agent. Likewise polyisocyanurate foams are made by reacting polyisocyanates and isocyanate-reactive hydrogen containing compounds in the presence of a trimerization catalyst and a blowing agent. In accordance with a certain trend in the art, the expression "polyurethane" as used herein is intended to refer to products obtained by reacting polyisocyanates with isocyanate-reactive hydrogen containing compounds and optionally with water, and the expression "isocyanate-reactive hydrogen containing compounds" as used herein is intended to include polyols as well as polyamines.

The expression "polyurethane" is thus intended also to include products which comprise urethane linkages (resulting from the reaction of isocyanate groups with hydroxyl groups of polyols) together with urea linkages (resulting from the reaction of isocyanate groups with amine groups of polyamines or with water), and even products which essentially comprise urea linkages with few or no urethane linkages.

Isocyanate-reactive hydrogen containing compounds for preparing flexible polyurethane foams are generally selected from polyols and polyamines with a functionality of 2-4 and an average equivalent weight ranging from 300–2500, preferably from 500 to 2000. Isocyanate-reactive hydrogen containing compounds for preparing rigid polyurethane and polyisocyanurate foams are preferably selected from polyols and polyamines with a functionality of at least 2 and a molecular weight from 60–1500.

Suitable polyols which can be employed include polyether and polyester polyols, polythioethers, polycetals, polycarbonates and polyesteramides.

Suitable polyether polyols include those which are prepared by reacting one or more alkylene oxides or substituted alkylene oxides with one or more active hydrogen containing initiator compounds. Suitably such oxides include for example ethylene oxide, propylene oxide, butylene oxide, epichlorhydrin and epibromhydrin.

Suitable initiator compounds include, for example, water ethylene glycol, propylene glycol, butane diol, hexane diol, glycerol, trimethylol propane, pentaerythritol, hexanetriol, triethanolamine, sorbitol, sucrose, hydroquinone, resorcinol, catechol, bisphenols, novolac resins and phosphoric acid. These initiators may be used as polyols as well.

Further suitable initiators include, for example, ammonia, ethylenediamine, diaminopropanes, diaminobutanes, diaminopentanes diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, and 3,5,3',5'-tetraethyl-4,4'-diaminodiphenylmethane.

Suitable polyester polyols which can be employed include, for example, those prepared by reacting one or more polycarboxylic acids or anhydrides or esters thereof with one or more polyhydric alcohols. The polycarboxylic acids may be aliphatic, cycloaliphatic, aromatic and/or heterocyclic and may be substituted (e.g. with halogen) and/or unsaturated. Examples of carboxylic acids of this kind include glutaric acid, succinic acid, adipic acid, suberic acid, azelaic acid, sebacic acid, phthalic acid, terephthalic acid, isophthalic acid, trimellitic acid, tetrahydrophthalic acid, hexahydrophthalic acid, tetrachlorophthalic acid, maleic acid, fumaric acid, dimeric and trimeric fatty acids, which may be in admixture with monomeric fatty acids, and the like.

Examples of suitable polyhydric alcohols include ethylene glycol; 1,2-propylene glycol; 1,3-propylene glycol; butylene glycols; 1,6-hexane diol; 1,8-octane diol; neopentyl glycol; 2-methyl-1,3-propane diol; glycerol; trimethylol propane; 1,2,6-hexane triol; 1,2,4-butane triol; trimethylol ethane; pentaerythritol; diethylene glycol; triethylene glycol; polyethylene glycols; dipropylene glycol; tripropylene glycol; polypropylene glycols; dibutylene glycol; or polybutylene glycols. It is also possible to use polyesters of lactones such as caprolactone.

Suitable polyether polyamines which can be employed include those which are prepared by amination of polyether polyols of the type described above. For use in accordance with the invention it is not necessary that the amination of the polyols be complete. Partially aminated polyether polyols of the type disclosed above can also be employed.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polyaddition reaction (for instance between polyisocyanates and amino-functional compounds or a polycondensation reaction (for instance between formaldehyde and phenols and/or amines) in situ in such polyols. Suitable are also polyhydroxyl derivatives modified by vinyl-polymerisation, such as for example obtained by polymerising styrene and acrylonitrile in the presence of polyether polyols or polycarbonate polyols.

Mixtures of polyols and/or polyamines and/or water may be used. The compositions according to the present invention and the polyisocyanate may be reacted under conventional foam-forming conditions. In general, this involves preparing a reaction mixture containing a blowing agent and one or more catalysts in addition to the polyisocyanate and the composition according to the present invention. Such reaction mixtures may also contain other conventional ingredients, like surfactants and flame retardants alinea. Organo clays as such are known. Organo clays are organophilic cation-modified clays derived from a clay mineral by replacing the inorganic exchangeable cations in the clay mineral by organic cations comprising at least one hydrocarbon radical which has sufficient carbon atoms to render the surface of the cation-exchanged clay hydrophobic.

Preferably organophilic cation-modified clays are employed, derived from a clay mineral selected from the group consisting of montmorillonite, bentonite, beidellite, hectorite, saponite and stevensite.

The organic cations may be those derived from tertiary phosphonium salts and quaternary ammonium salts comprising at least one hydrocarbon radical which has sufficient carbon atoms to render the surface of the cation-exchanged clay hydrophobic. Preferably the organic cations are represented by the general formula

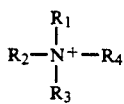

wherein $R_1$ is a saturated or unsaturated alkyl group having from 10-24 carbon atoms and $R_2$, $R_3$ and $R_4$, which are the same or different, are a saturated or unsaturated alkyl group having from 1-24 carbon atoms or an aralkyl group having from 7-10 carbon atoms. Examples of such cations are those derived from benzyl methyl dialkyl ammonium chlorides, dimethyl dialkyl ammonium chlorides, benzyl dimethyl alkyl ammonium chlorides and benzyl trialkyl ammonium chlorides.

Processes for making organo clay from clay minerals and tertiary phosphonium or quaternary ammonium salts are known. Cyclic alkylene carbonates are known as well. The alkylene chain may have 3-10 carbon atoms and preferably 3-6 carbon atoms. Preferred compounds are butylene carbonate and propylene carbonate. Most preference is given to propylene carbonate.

The relative amount of the isocyanate-reactive hydrogen containing compound, the organo clay and the polar activator may vary between wide ranges. In general the amounts will range from 60-99.98, preferably from 80-99.9 and more preferably from 88-99.85% weight of isocyanate-reactive hydrogen containing compound, 0.01-20, preferably from 0.05-10 and more preferably from 0.1-8% weight of organo clay and 0.01-20, preferably from 0.05-10 and more preferably from 0.05-4% weight of polar activator, calculated from the total amount of isocyanate-reactive hydrogen containing compound, polar activator and organo clay in the composition.

The composition according to the present invention may comprise, preferably less than 25% weight (calculated from the total amount of isocyanate-reactive hydrogen containing compound, polar activator and organo clay in the composition), of an inert, low boiling liquid. The presence of such a liquid may have advantages as will be explained hereinafter.

The inert, low boiling liquid may be any such liquid known in the art. Low boiling in this context means having a boiling point at atmospheric pressure of below 85° C. and preferably of 20°-80° C. Preference is given to lower halogenated alkanes such as methylene chloride, trichloro-fluoromethane, $CHCl_3$ $CCl_4$. Most preferably an inert, low-boiling liquid is used which is non-toxic and non-inflammable, like $Cl_3FC$.

The compositions according to the present invention further may comprise conventional additives like catalysts, surface active agents, flame retardants, cell stabilisers, fillers, chain-extenders, cross-linking agents, curing agents and fibrous reinforcements. The composition according to the present invention preferably further comprises 0.25-10% weight, calculated on the amount of organo clay in the composition, of a degellant. Degellants are known as such. Suitable degellants may, dependent on the polarity of the composition, be selected from polyphosphates, polyacrylamides, tannates, lead ethylhexylcarboxylate, barium sulphonate, calcium ethylhexylcarboxylate and other metal soaps, organo titanates, like neoalkoxy,trineodecanoyl titanate and neoalkoxy,tri(dioctylphosphato)titanate and dialkyl phosphoric acids like bis (ethylhexyl)phosphoric acid. The titanates are the most preferred ones.

The composition according to the invention is prepared by combining and mixing the isocyanate-reactive hydrogen containing compound, the organo clay and the polar activator. Such combination may be conducted in any order provided each combination step is followed by mixing and preferably by thorough mixing. More preferably at least one of the mixing steps following the combination of the polar activator and the organo clay is a high shear mixing step.

If the composition according to the invention is prepared from isocyanate-reactive hydrogen containing compounds having a low molecular weight, especially those which are suitable for preparing rigid foams, the composition preferably is prepared by combining and mixing the isocyanate-reactive hydrogen containing compound, the organo clay, the polar activator and an inert, low-boiling liquid and subsequently removing at least part of the inert, low-boiling liquid. This combination may, likewise, be conducted in any order. Preferably, the organo clay and the polar activator are blended first then this blend is combined and mixed with the inert, low-boiling liquid; subsequently this mixture is combined and mixed with the isocyanate-reactive hydrogen containing compound.

The relative amounts of the isocyanate-reactive hydrogen containing compound, the polar activator and the organo clay may be essentially the same as those wanted in the final composition. If the final composition should comprise a very high amount of isocyanate-reactive hydrogen containing compound (e.g. above 98% weight) it is preferred to combine and mix a lower relative amount of isocyanate-reactive hydrogen containing compound with the organo clay, the polar activator and the inert low-boiling liquid and, after these combination and mixing steps, to add extra isocyanate-reactive hydrogen containing compound in order to arrive at the finally wanted composition. This procedure improves the efficiency of the mixing process. Extra isocyanate-reactive hydrogen containing compound may be added before or after the inert, low-boiling liquid is removed. Removed inert, low-boiling liquid may be used again for preparing the next amount of the composition according to the present invention.

The relative amounts which are to be combined are—preferably—as follows: isocyanate-reactive hydrogen containing compounds: 60-98% weight, preferably 80-98% weight and more preferably 88-97% weight; polar activator: 1-20% weight, preferably 1-10% weight and more preferably 1-4% weight; and organo clay: 1-20% weight, preferably 1-10% weight and more preferably 2-8% weight. The amount of inert, low-boiling liquid combined and mixed with the other ingredients may vary from 25-200% weight. All these relative amounts are calculated from the total amount of isocyanate-reactive hydrogen containing compound, polar activator and organo clay in the combination.

The combination of the ingredients is preferably conducted at ambient temperature and pressure. Due to the mixing process the temperature of the mixture may rise to more elevated levels. Measures should be taken in order to avoid unwanted removal of the inert, low-boiling liquid due to such temperature rise. This can be achieved easily, e.g. by cooling or by mixing in a closed, possibly pressurised, vessel. Of course, the same measures could be taken if an inert, low-boiling liquid is used which boils below ambient temperature.

If the low-boiling liquid is useful as a blowing agent for making foams, up to 25% weight of the inert, low-boiling liquid may be left in the composition according to the present invention (the amount of inert, low-boiling liquid being calculated from the amount of isocyanate-reactive hydrogen containing compound, organo clay and polar activator). The inert, low-boiling liquid is removed by methods known per se. Preferably the low-boiling liquid is removed by raising the temperature of the combination above the boiling point of the low-boiling liquid. The relative amount of inert, low-boiling liquid may also be lowered by adding extra isocyanate-reactive hydrogen containing compound.

The degellant may be added at any stage. Preferably the degellant is combined with the organo clay and the polar activator in the first step of the preparation process. If desired, usual additives may be added during or after the process for the preparation of the composition according to the present invention.

The compositions, prepared as hereinbefore described, will preferably comprise 60-98% weight of isocyanate-reactive hydrogen containing compound calculated from the total amount of isocyanate-reactive hydrogen containing compound, polar activator and organo clay. Such compositions may be used directly for instance for preparing polyurethanes for coating purposes.

For making polyurethane rigid and flexible foams and polyisocyanurate foams the amount of isocyanate-reactive hydrogen-containing compound in the composition according to the invention often may be higher.

This can be achieved simply by adding extra isocyanate-reactive hydrogen containing compound to the composition comprising 60-98% weight of isocyanate-reactive hydrogen-containing compound so as to obtain a composition which comprises up to 99,98% weight of isocyanate-reactive hydrogen-containing compound and down to 0.01% weight of polar activator and organo clay.

The polyisocyanates used for preparing polyurethanes from the composition according to the present invention may be selected from any—preferably organic—polyisocyanate compound or mixture of polyisocyanate compounds, provided said compounds have at least 2 isocyanate groups. Organic polyisocyanates include di-isocyanates, particularly aromatic di-isocyanates and isocyanates of higher functionality.

Examples of organic polyisocyanates which may be used in the process of the invention include aliphatic isocyanates such as hexamethylene diisocyanate, aromatic isocyanates such as meta-and para-phenylene diisocyanate, tolylene-2,4- and 2,6-diisocyanates, diphenylmethane-4,4'-diisocyanate, chlorophenylene-2,4-diisocyanate, naphtylene-1,5-diisocyanate, diphenylene-4,4'-diisocyanate, 4,4'-diisocyanate-3,3'-dimethylphenyl, 3-methyldiphenylmethane-4,4'-diisocyanate and diphenyl ether diisocyanate, cycloaliphatic diisocyanates such as cyclohexane -2,4-and 2,3-diisocyanates, 1-methyl cyclohexyl-2,4- and 2,6-diisocyanates and mixtures thereof and bis- (isocyanatocyclohexyl-)methane and tri- isocyanates such as 2,4,6-triisocyanatotoluene and 2,4,4-triisocyanatodiphenylether.

Modified polyisocyanates, like those containing isocyanurate-, carbodiimide-, uretonimine-, urea-, biuret-, allophanate- or uretidinedione groups may be employed as well.

Mixtures of isocyanates may be used, for example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher poly-isocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or crude mixtures of methylene bridged polyphenyl polyisocyanates containing diisocyanates, triisocyanate and higher functionality polyisocyanates. Methylene bridged polyphenyl polyisocyanates are well known in the art and have the generic formula:

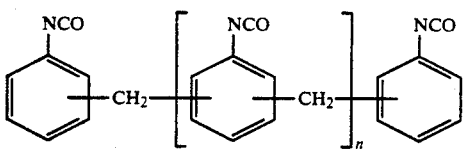

where n is 0 or more and in the case of the crude mixtures represents an average of more than one. They are prepared by phosgenation of corresponding mixtures of polyamines obtained by condensation of aniline and formaldehyde. For convenience, crude mixtures of methylene bridged polyphenyl polyisocyanates containing diisocyanate, triisocyanate and higher functionality polyisocyanates are referred to hereinafter as MDI.

Other organic isocyanates which can be used in the invention include isocyanate-ended prepolymers made by reaction of an excess of a diisocyanate or higher functionality polyisocyanate with a hydroxyl-ended polyester or hydroxyl-ended polyether and products obtained by reacting an excess of diisocyanate or higher functionality polyisocyanate with a monomeric polyol or mixture of monomeric polyols such as ethylene glycol, trimethylol propane or butane-diol and isocyanate-ended prepolymers prepared using hydrophobic polyols such as castor oil.

The most preferred polyisocyanates are polymethylene polyphenylene polyisocyanates and isocyanate-ended prepolymers thereof. Preferably, the polyisocyanate is liquid at room temperature.

The invention is further illustrated by means of the following examples.

EXAMPLE 1

68.2 pbw of Suprasec VM 25 (a polyisocyanate from Imperial Chemical Industries, trade name) was mixed and allowed to react at room temperature in an open vessel with a polyol composition comprising 100 pbw of Daltocel F 2805 (a polyol from Imperial Chemical Industries, trade name); 3 pbw of water; 1 pbw of DABCO 33 LV (a catalyst from Arco, trade name), pbw of Tegostab B 4113 (a surfactant from Goldschmidt, trade name), 0.1 pbw of Niax Al and 10 pbw of $Cl_3FC$. The ratio of the maximum height the foam attained and the weight of the ingredients used ($H_{max}/w$) was 0.75 while the ratio of the height of the foam 5 minutes after the reaction started and said weight ($H_5/w$) was 0.74. The recession was 1.2%.

EXAMPLE 2

100 pbw of Bentone 27 (organo clay from National Lead Chemicals, trade mark), 50 pbw of propylene carbonate and 5 pbw of Lica 12 (a titanate from Kenrich Petrochemicals Inc., trade name) were dry-blended.

7.55 pbw of this blend was added to 97.5 pbw of Daltocel F 2805, mixed and subsequently mixed under high shear conditions for 20 minutes.

5.2 pbw of this mixture was added to a polyol composition which was identical to the one used in example 1 with the exception that the amount of Daltocel F 2805 was 95.1 pbw instead of 100 pbw. This Bentone comprising polyol composition was reacted with 68.2 pbw of Suprasec VM 25 as described in example 1. $H_{max}/w$ was 0.73 and $H_5/w$ was 0.68. The recession was 6.6%.

EXAMPLE 3

The reactions carried out in examples 1 and 2 were repeated in a low pressure machine for preparing flexible foams. The foams were applied to a crushing machine under the same conditions. In order to obtain sufficient crushing, the foam according to the present invention needed to be crushed only once while the conventional foam needed to be crushed more than two times.

EXAMPLE 4

The following blends were made

Blend 1: 2.5 g propylene carbonate and 5 g dried Bentone 27 were blended and added to 92.25 g Daltocel F 2805 and mixed under high shear conditions; finally 0.25 g Lica 12 was added and mixed.

Blend 2: 5 g dried Bentone 27 and 2.5 g propylene carbonate were blended and added to 92.5 g Daltocel F 2805 followed by high shear mixing.

Blend 3: 5 g dried Bentone 27 and 2.5 g acetone were blended and added to 92.5 g Daltocel F 2805 followed by high shear mixing.

Blend 4: 5 g dried Bentone 27 was mixed with 95 g of Daltocel F 2805 under high shear conditions.

Blend 5: 5 g dried Bentone 27 was mixed in 95 g of Daltocel F 2805.

From the blends the following polyol formulations were made:

|  | Polyol Formulation | | | | | |
| --- | --- | --- | --- | --- | --- | --- |
|  | 1 | 2 | 3 | 4 | 5 | 6 |
| Daltocel F 2805 | 89.8 | 89.8 | 89.8 | 89.6 | 89.6 | 100 |
| Blend | 1 | 2 | 3 | 4 | 5 | — |
| Blend amount | 11 | 11 | 11 | 11 | 11 | — |
| $H_2O$ | 3 | 3 | 3 | 3 | 3 | 3 |
| Niax Al | 0.1 | 0.1 | 0.1 | 0.1 | 0.1 | 0.1 |
| Tegostab B 4113 | 1 | 1 | 1 | 1 | 1 | 1 |
| Dabco 33 LV | 1 | 1 | 1 | 1 | 1 | 1 |
| Arton II | 10 | 10 | 10 | 10 | 10 | 10 |

All amounts are in parts by weight.

From these formulations foams (1-6) were made (index=100) by reacting 283.5 parts of the formulation (283.3 parts of formulations 4 and 5) with 166.5 parts of Suprasec VM 25 (166.7 parts for formulations 4 and 5).

The blends, the polyol formulations and the foams had the following properties (The Casson viscosity is defined in "Paint Flow and Pigment Dispersion" by T. C. Patton, edited by Wiley Interscience, 2nd edition, 1979, ISBN 0-471-03272-7, page 357; the yield value is a known parameter which can be measured by a rheometer, like a Cone and Plate Rheometer):

|  | Blends | | | | |
| --- | --- | --- | --- | --- | --- |
|  | 1 | 2 | 3 | 4 | 5 |
| Casson Viscosity (Pa.s) | 2.2 | 1.5 | 1.9 | 2.9 | 1.5 |
| Yield value ($N/m^2$) | 17.0 | 437 | 119 | 93.5 | 0.16 |

|  | Polyol Formulations | | | | |
| --- | --- | --- | --- | --- | --- |
|  | 1 | 2 | 3 | 4 | 5 |
| Casson Viscosity (Pa.s) | 0.88 | 1.00 | 0.88 | 0.94 | 0.82 |
| Yield value ($N/m^2$) | 0.24 | 1.34 | 0.55 | 0.75 | 0.09 |

| Foams |
| --- |

-continued

| | 1 | 2 | 3 | 4 | 5 | 6 |
|---|---|---|---|---|---|---|
| recession | 3.7 | 14.9 | 1.5 | 4.1 | 1.0 | 0.7 |

Blends 2 and 4 appeared to be difficult to handle as they were highly gelled. Blend 2 offered a superior recession compared with blend 4. Blend 1 was excellently handable and offered good recession.

EXAMPLE 5

50 parts by weight dried Bentone 27 and 25 parts by weight propylene carbonate were blended and mixed with Arcton 11 (1200 parts). This mixture was subsequently combined with 400 parts by weight of a polyol (a mixture of 39.1 parts by weight of Daltolac P 230 from Imperial Chemical Industries, 9.8 pbw Voranol RA 800 from DOW Chemicals, 39.1 pbw of a polyol having a functionality of 3.2 and a hydroxyl value of 500 and 12.0 pbw of a flame retardant, TCEP) and thoroughly mixed. Then the Arcton 11 was completely removed. Then the dispersion obtained was diluted with the above polyol to a Bentone 27 content of 5.7%w. A polyol formulation was made comprising 3.31 parts by weight (pbw) of the above blend, 35.3 pbw of the polyol used in the above blend, 0.36 pbw of surfactant SR 242 from Air Products, 0.18 pbw of $H_2O$, 1.1 pbw SFC catalyst and 11.71 pbw of Arcton 11. A rigid foam was prepared by reacting this polyol formulation with 51.35 pbw of Suprasec VM 90 HF (index 110). The density of the foam was 25.7 kg/m$^3$. A similar foam prepared without Bentone 27 and propylene carbonate has a density of 31.2 kg/m$^3$.

We claim:
1. Composition comprising an isocyanate-reactive hydrogen containing compound, an organophilic cation-modified clay derived from a clay mineral and a cyclic alkylene carbonate.
2. Composition according to claim 1, characterised in that the composition further comprises a degellant.
3. Composition according to claim 2, characterised in that the degellant is an organo titanate.
4. Composition according to claim 1, characterised in that the composition comprises 60-99.98 % weight of isocyanate-reactive hydrogen containing compound, 0.01-20% weight of organo clay and 0.01-20% weight of cyclic alkylene carbonate, calculated from the total amount of isocyanate-reactive hydrogen containing compound, organo clay and cyclic alkylene carbonate in the composition.
5. Composition according to claim 1, characterised in that the composition further comprises an inert, low-boiling liquid.
6. Composition according to claim 1, characterised in that the organo clay is an organophilic cation-modified clay derived from a clay mineral selected from the group consisting of montmorillonite, bentonite, beidellite, hectorite, saponite and stevensite.
7. Composition according to claim 1, characterised in that the cyclic alkylene carbonate is propylene carbonate.
8. Process for preparing a composition according to claim 1, characterised in that the composition is prepared by combining and mixing the isocyanate-reactive hydrogen containing compound, the organo clay and the cyclic alkylene carbonate.

* * * * *

UNITED STATES PATENT AND TRADEMARK OFFICE
CERTIFICATE OF CORRECTION

PATENT NO. : 5,076,959
DATED      : December 31, 1991
INVENTOR(S) : Barker et al It is certified that error appears in the above-identified patent and that said Letters Patent is hereby corrected as shown below:

On the title page:

Column 1, Item [21]

--[21]    Appl. No.: 409,693 --

Signed and Sealed this

Thirteenth Day of July, 1993

Attest:

MICHAEL K. KIRK

Attesting Officer

Acting Commissioner of Patents and Trademarks